(12) United States Patent
Seo et al.

(10) Patent No.: US 10,460,200 B2
(45) Date of Patent: Oct. 29, 2019

(54) APPARATUS AND METHOD OF ANALYZING TOOL TRACE, AND COMPUTER PROGRAM FOR EXECUTING THE METHOD

(71) Applicant: Republic of Korea (National Forensic Service Director Ministry of Public Administration and Security), Seoul (KR)

(72) Inventors: Young Il Seo, Wonju-si (KR); Sang Yoon Lee, Siheung-si (KR); Eun Ah Joo, Yongin-si (KR); Dong A Lim, Yuseong-gu (KR); Jin Pyo Kim, Yuseong-gu (KR); Nam Kyu Park, Bucheon-si (KR)

(73) Assignee: Republic of Korea (National Forensic Service Director Ministry of Public Administration and Security), Seoul (KR)

( * ) Notice: Subject to any disclaimer, the term of this patent is extended or adjusted under 35 U.S.C. 154(b) by 126 days.

(21) Appl. No.: 15/799,820

(22) Filed: Oct. 31, 2017

(65) Prior Publication Data
US 2019/0026595 A1 Jan. 24, 2019

(30) Foreign Application Priority Data
Jul. 19, 2017 (KR) ........................ 10-2017-0091611

(51) Int. Cl.
*G06K 9/62* (2006.01)
*G06F 3/0488* (2013.01)
(Continued)

(52) U.S. Cl.
CPC ......... *G06K 9/6202* (2013.01); *G06F 3/0488* (2013.01); *G06F 3/14* (2013.01);
(Continued)

(58) Field of Classification Search
CPC .. G06K 9/6202; G06K 9/6267; G06F 3/0488; G06F 17/30277; G06F 3/14
See application file for complete search history.

(56) References Cited

U.S. PATENT DOCUMENTS 8,090,223 B1 * 1/2012 Prokoski ................. F42B 35/00
382/100

FOREIGN PATENT DOCUMENTS

| JP | 2002-245060 A | 8/2002 |
| JP | 2015-212650 A | 11/2015 |

(Continued)

OTHER PUBLICATIONS

Matsubara et al: An English machine translation of JP2015-212650, 2015.*

*Primary Examiner* — Ruiping Li
(74) *Attorney, Agent, or Firm* — Schwegman Lundberg & Woessner, P.A.

(57) ABSTRACT

Provided is a method of analyzing a tool trace, the method being performed by a tool trace analyzing apparatus including a camera unit and including obtaining a first image that is a three-dimensional (3D) image of the tool trace; displaying the first image on a screen; storing, in a database, second images that are 3D images of one or more tools and that correspond to a plurality of pieces of feature information of the one or more tools; when a specific tool is selected based on a user input, searching for a second image from among the second images in the database, the second image corresponding to the specific tool, and displaying the second image on the screen; matching the second image with the first image and thus generating a match image; and displaying the match image on the screen.

10 Claims, 8 Drawing Sheets

(51) Int. Cl.
*G06F 3/14* (2006.01)
*G06F 16/532* (2019.01)
*G06K 9/00* (2006.01)
*G06K 9/22* (2006.01)

(52) U.S. Cl.
CPC ....... *G06F 16/532* (2019.01); *G06K 9/00201* (2013.01); *G06K 9/00671* (2013.01); *G06K 9/228* (2013.01); *G06K 9/6267* (2013.01)

(56) References Cited

FOREIGN PATENT DOCUMENTS

KR 10-2006-0131145 A 12/2006
KR 10-2011-0050081 A 5/2011

* cited by examiner

APPARATUS AND METHOD OF ANALYZING TOOL TRACE, AND COMPUTER PROGRAM FOR EXECUTING THE METHOD

CROSS-REFERENCE TO RELATED APPLICATION

This application claims the benefit of Korean Patent Application No. 10-2017-0091611, filed on Jul. 19, 2017, in the Korean Intellectual Property Office, the disclosure of which is incorporated herein in its entirety by reference.

BACKGROUND

1. Field

One or more embodiments relate to an apparatus and method of analyzing a tool trace, and a computer program for executing the method.

2. Description of the Related Art

In a crime scene investigation into a theft or explosive-related crime, to analyze a tool, i.e., to analyze which tool was used to open a safe, to manufacture an explosive, or the like, serves an important role in an investigation. According to a type of a tool, i.e., whether the tool is a cutting tool or pressing tool, or whether the tool is double-bladed or single-bladed, the tool leaves a specific tool trace, and based on such specific tool traces, it is possible to analyze which tool was used. According to the related art, in order to analyze a tool trace, silicon rubber is attached to a trace of damage so as to physically extract a form or the trace of damage is visually examined, so that a target tool is determined. However, a method of physically extracting a form by using the silicon rubber takes long hours in an analysis, and visual examination using the human eyes may be incorrect.

SUMMARY

One or more embodiments include an apparatus and method of analyzing a tool trace, and a computer program for executing the method. In more detail, the one or more embodiments include an apparatus and method of analyzing a tool corresponding to a tool trace by obtaining a three-dimensional (3D) image of the tool trace, and a computer program for executing the method.

Additional aspects will be set forth in part in the description which follows and, in part, will be apparent from the description, or may be learned by practice of the presented embodiments.

According to one or more embodiments, a method of analyzing a tool trace, the method being performed by a tool trace analyzing apparatus including a camera unit, includes obtaining a first image that is a three-dimensional (3D) image of the tool trace; displaying the first image on a screen; storing, in a database, second images that are 3D images of one or more tools and that correspond to a plurality of pieces of feature information of the one or more tools; when a specific tool is selected based on a user input, searching for a second image from among the second images in the database, the second image corresponding to the specific tool, and displaying the second image on the screen; matching the second image with the first image and thus generating a match image; and displaying the match image on the screen.

The obtaining of the first image may include obtaining two-dimensional (2D) images at a plurality of different locations with respect to the tool trace by using the camera unit; and generating the first image that is the 3D image by using the 2D images.

The obtaining of the 2D images may include obtaining the 2D images captured at the plurality of different locations in 360-degree all directions with respect to the tool trace.

The method may further include classifying the plurality of pieces of feature information into one or more categories, and externally displaying a classification image including the plurality of pieces of classified feature information of the one or more tools.

The displaying of the second image on the screen may include, when feature information from among the plurality of pieces of classified feature information included in the classification image is selected, searching for the second image of the specific tool corresponding to the selected feature information, and displaying the second image on the screen.

According to one or more embodiments, a medium includes a computer program for executing the method, by using a computer.

According to one or more embodiments, a tool trace analyzing apparatus includes a camera unit configured to obtain two-dimensional (2D) images by imaging a tool trace at a plurality of different locations with respect to the tool trace; a first image generator configured to generate a first image that is a three-dimensional (3D) image of the tool trace by using the 2D images; a database configured to store second images that are 3D images of one or more tools; a match image generator configured to search for a second image from among the second images in the database, the second image corresponding to a tool selected from among the one or more tools based on an external input, and to generate a match image by matching the second image with the first image; and a display configured to externally display the first image, the second image, and the match image.

The database may be further configured to store the second images that correspond to a plurality of pieces of feature information of the one or more tools.

The tool trace analyzing apparatus may further include a feature information classifying unit configured to classify the plurality of pieces of feature information into one or more categories and to provide, to the display, a classification image including the plurality of pieces of classified feature information of the one or more tools.

The tool trace analyzing apparatus may further include a user command recognizer configured to recognize a user input, and wherein, when feature information from among the plurality of pieces of classified feature information included in the externally displayed classification image is selected by the user command recognizer, the match image generator is further configured to search for the second image of the tool corresponding to the selected feature information, and to generate the match image by matching the second image with the first image.

Aspects, features, and advantages other than the aforementioned descriptions may be understood more readily by reference to the accompanying drawings, claims, and the following detailed descriptions of embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
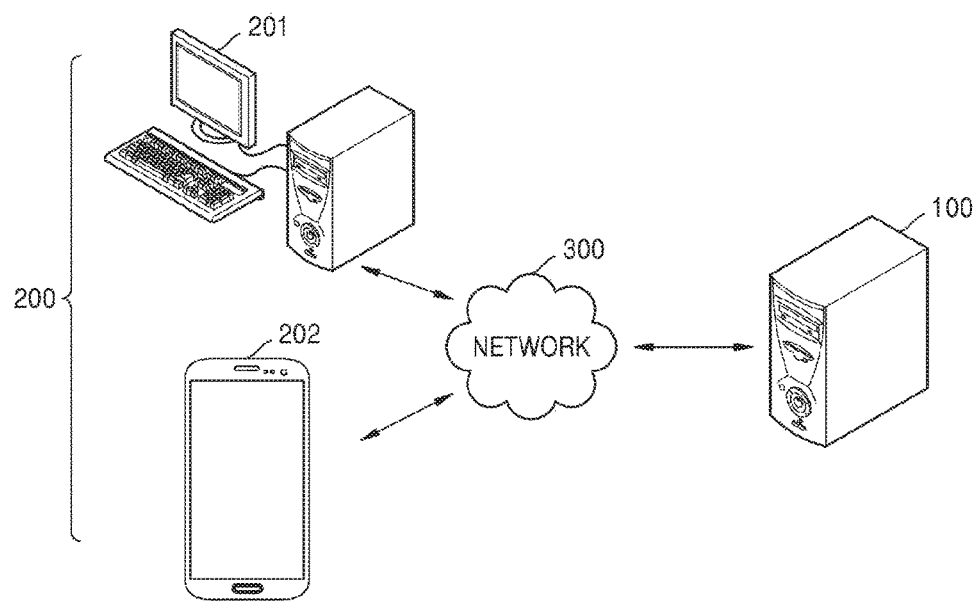
FIG. 1 illustrates a tool trace analyzing system, according to an embodiment.

As the disclosure allows for various changes and numerous embodiments, particular embodiments will be illustrated in the drawings and described in detail in the written description. Effects and features of the disclosure and methods of accomplishing the same may be understood more readily by reference to the following detailed description of embodiments and the accompanying drawings. The disclosure may, however, be embodied in many different forms and should not be construed as being limited to the embodiments set forth herein.

Reference will now be made in detail to embodiments of the present disclosure, examples of which are illustrated in the accompanying drawings, wherein components that are the same or are in correspondence are rendered the same reference numeral regardless of the figure number, and redundant explanations are omitted.

Throughout the specification, while such terms as "first," "second," etc., may be used to describe various components, such components must not be limited to the above terms. The above terms are used only to distinguish one component from another.

Throughout the specification, a singular form may include plural forms, unless there is a particular description contrary thereto.

Throughout the specification, it will be further understood that the terms "comprise", "include," and/or "have," when used in this specification, specify the presence of stated features, and/or components, but do not preclude the presence or addition of one or more other features, and/or components.

Throughout the specification, it will also be understood that when a layer, a region, an element, or the like is referred to as being "on" another layer, region, or element, it can be directly on the other layer, region, or element, or intervening layer, region, or element may also be present.

In the drawings, the thicknesses of layers and regions are exaggerated for clarity. For example, the thicknesses and sizes of elements in the drawings are arbitrarily shown for convenience of description, thus, the spirit and scope of the present disclosure are not necessarily defined by the drawings.

Also, it should also be noted that in some alternative implementations, the steps of all methods described herein may occur out of the order. For example, two steps illustrated in succession may in fact be executed substantially concurrently or the two steps may sometimes be executed in the reverse order.

Throughout the specification, it will also be understood that when a layer, a region, an element, or the like is referred to as being "connected to" or "coupled with" another layer, region, or element, it can be directly connected to or coupled with the other layer, region, or element, or it can be indirectly connected to or coupled with the other layer, region, or element by having an intervening layer, region, or element interposed therebetween. For example, throughout the specification, when a layer, a region, an element, or the like is referred to as being "electrically connected to" or "electrically coupled with" another layer, region, or element, it can be electrically connected to or coupled with the other layer, region, or element in a direct manner, or it can be electrically connected to or coupled with the other layer, region, or element in an indirect manner by having an intervening layer, region, or element interposed therebetween.

As used herein, the term "and/or" includes any and all combinations of one or more of the associated listed items.

FIG. 1 illustrates a tool trace analyzing system, according to an embodiment.

Referring to FIG. 1, the tool trace analyzing system according to the present embodiment includes a server 100, a user terminal 200, and a network 300 connecting the server 100 with the user terminal 200.

In the present specification, a tool trace means a mark formed when an object is broken by a tool.

The tool trace analyzing system according to the present embodiment provides a tool trace analyzing service. In more detail, the tool trace analyzing system may upload data and may share the uploaded data with other users, wherein a user obtains the data from an experiment or by performing a method of analyzing a tool trace to be described below. For example, the user may obtain a three-dimensional (3D) image according to a type of a tool used as a crime weapon, and may upload data of the 3D image. When the user uploads the data, the tool trace analyzing system according to the present embodiment registers the data in the server 100, and provides an interface for other users to check the data registered in the server 100. The tool trace analyzing system may build a database of 3D images through the aforementioned process, wherein the 3D images are based on types of tools used in crimes.

The user terminal 200 refers to a communication terminal having a camera unit and a touchscreen, and capable of using a web service in a wired or wireless communication environment. In this regard, the user terminal 200 may be a personal computer 201 of the user or a portable terminal 202 of the user. Referring to FIG. 1, the portable terminal 202 is a smartphone, but the present disclosure is not limited thereto, and any terminal to which an application having programmed therein the method of analyzing a tool trace according to an embodiment can be installed and that has a camera unit may be used without limitation.

The user terminal 200 further includes a display displaying an execution screen, and an input device receiving an input of data from the user. For example, the input device may include, but is not limited to, a keyboard, a mouse, a trackball, a microphone, at least one button, a touch panel, or the like.

The network 300 is configured to connect the user terminal 200 to the server 100. For example, the network 300 provides a connection path for the user terminal 200 to transmit and receive packet data to and from the server 100 after the user terminal 200 accesses the server 100.

Although not illustrated in the drawings, the server 100 according to the present embodiment may include a memory, an input/output unit, a program storing unit, a controller, or the like.

Figure 2:
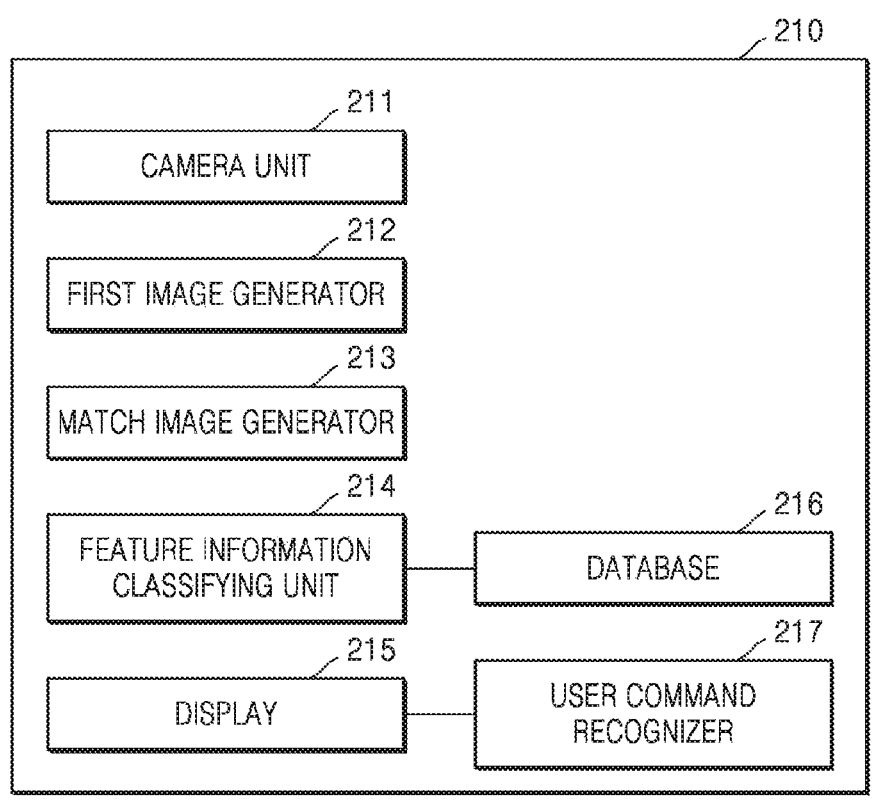
FIG. 2 is a block diagram of a tool trace analyzing apparatus included in a user terminal illustrated in FIG. 1.

FIG. 2 is a block diagram of a tool trace analyzing apparatus 210 included in the user terminal 200 illustrated in FIG. 1.

The tool trace analyzing apparatus 210 according to an embodiment may correspond to at least one processor or may include at least one processor. Thus, the tool trace analyzing apparatus 210 may operate as a unit included in a hardware device such as a microprocessor or a general-use computer system. The tool trace analyzing apparatus 210 may be mounted in the user terminal 200 illustrated in FIG. 1.

In order to prevent obscuring features of the present embodiment with unnecessary detail, the tool trace analyzing apparatus 210 illustrated in FIG. 2 only includes elements related to the present embodiment. However, it is obvious to one of ordinary skill in the art that more general-use elements than the elements illustrated in FIG. 2 may be further included in the tool trace analyzing apparatus 210.

Referring to FIG. 2, the tool trace analyzing apparatus 210 according to the present embodiment may include a camera unit 211, a first image generator 212, a match image generator 213, a feature information classifying unit 214, a display 215, a database 216, and a user command recognizer 217.

The camera unit 211 may capture images of a tool trace at a plurality of different locations with respect to the tool trace, thereby obtaining two-dimensional (2D) images. In this regard, when the user captures the images of the tool trace while changing locations of the user terminal 200, the camera unit 211 may obtain the 2D images of different angles in 360-degree all directions with respect to the tool trace.

The user command recognizer 217 recognizes an input signal input to the user terminal 200 by a user. The user may input the input signal to a touchscreen of the user terminal 200. The input signal input by the user may correspond to a user command.

The first image generator 212 may generate a first image by using the 2D images obtained by the camera unit 211, the first image being a 3D image of the tool trace. In this regard, although not illustrated, the tool trace analyzing apparatus 210 may further include a location information generator (not shown) of the user terminal 200, and may generate location information with respect to a location at which an image is captured by the camera unit 211. The first image generator 212 may generate the first image that is the 3D image of the tool trace by using a 2D image associated with the location information. In this regard, the location information may be information including global positioning system (GPS) information, gradient information, etc.

Second images that are 3D images corresponding to one or more tools may be stored in the database 216. The second images that correspond to a plurality of pieces of feature information of the one or more tools may be stored in the database 216. Here, feature information of a tool may include a usage method of the tool, a form of a tool head, whether the tool is double-bladed or single-bladed, a size of the tool, or the like.

The feature information classifying unit 214 may classify the plurality of pieces of feature information into one or more categories, may generate a classification image including the plurality of pieces of classified feature information of the tools, and may provide the classification image to the display 215. In this regard, the categories may be based on usage methods of the tools, a form of each tool head, and whether each tool is double-bladed or single-bladed, and the classification image may be an image in which the categories are classified as a logic tree.

The match image generator 213 may search for, in the database 216, a second image of a tool selected based on an external input, and may match the found second image with a first image, thereby generating a match image. In more detail, the match image generator 213 may match a first image, which is a 3D image of a tool trace, with a head part of the tool in the second image, thereby generating the match image. In addition, when at least one piece of feature information is selected from the classification image displayed on the display 215 via the user command recognizer 217, the match image generator 213 may search for a second image of a tool which corresponds to the selected feature information, may match the found second image with a first image, and thus may generate a match image.

The display 215 may externally display the first image, the found second image, and the match image.

Figure 3:
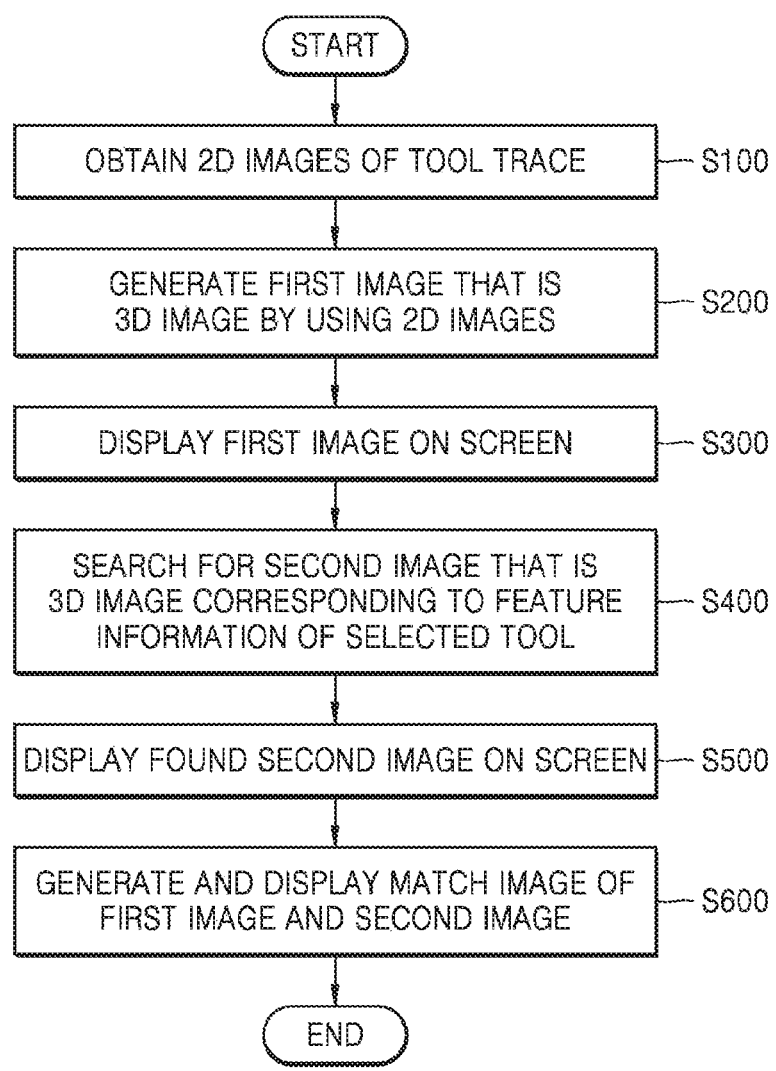
FIG. 3 illustrates a flowchart of a method of analyzing a tool trace, according to an embodiment.

FIG. 3 illustrates a flowchart of a method of analyzing a tool trace, according to an embodiment, and FIGS. 4 through 8 illustrate examples for describing embodiments of the method of analyzing a tool trace of FIG. 3.

Figure 4:
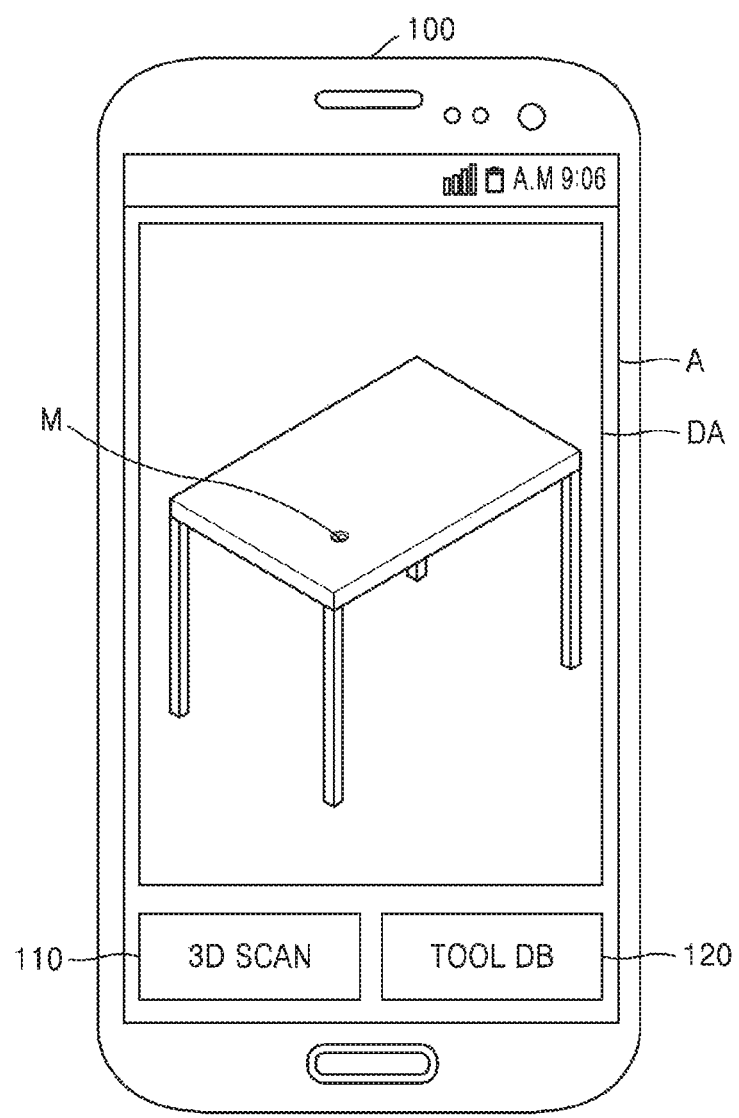
FIGS. 4 through 8 illustrate examples for describing embodiments of the method of analyzing a tool trace of FIG. 3.
Figure 5:
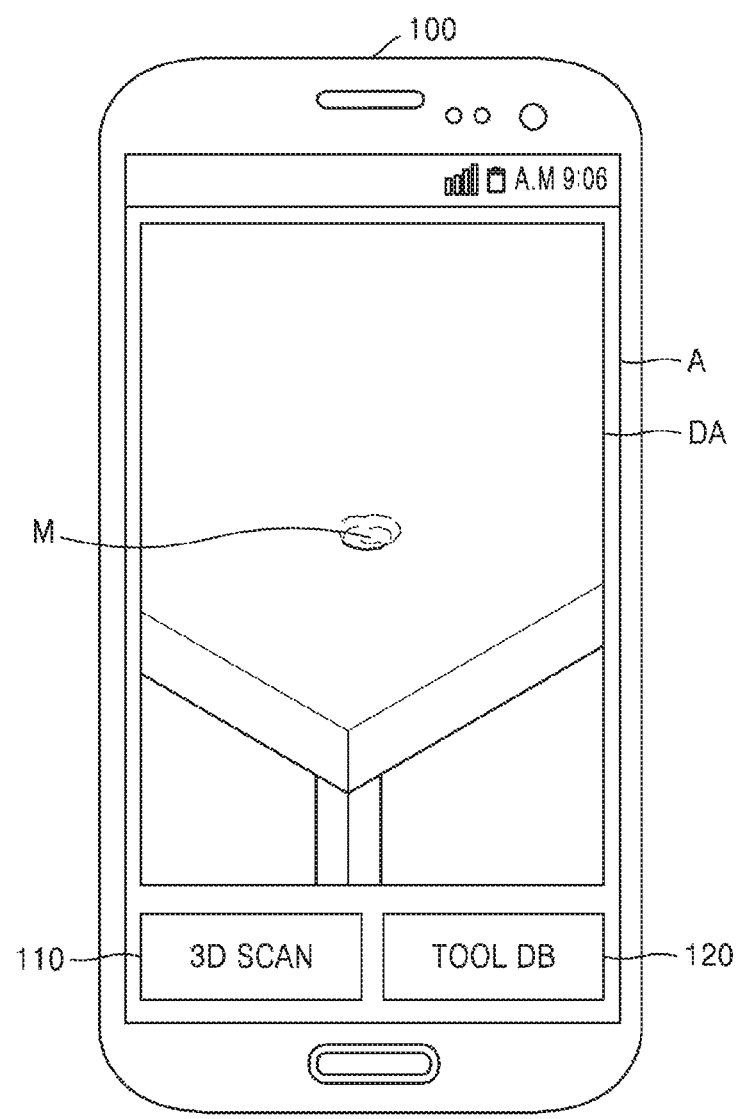

Referring to FIGS. 3 through 5, first, the tool race analyzing apparatus 210 may capture an image of a target object including a tool trace by using the camera unit 211, and may display the capture image on a screen A of the display 215. A user may check the tool trace displayed on the display 215, may touch a 3D scan button 110 when close to the tool trace, wherein the 3D scan button is placed below a display area DA, and thus may obtain a first image that is a 3D image of the tool trace.

In this regard, the camera unit 211 obtains 2D images at a plurality of different locations with respect to the tool trace (S100). In more detail, the 2D images may be obtained by capturing images of the tool trace at different angles in 360-degree all directions with respect to the tool trace. The tool trace analyzing apparatus 210 may generate location information corresponding to an image-captured location by using a location information generator (not shown) of the user terminal 200, and may obtain a 2D image associated with the location information. The first image generator 212 may generate a first image M that is the 3D image of the tool trace by using the 2D images obtained in the aforementioned manner (3200). The tool trace analyzing apparatus 210 may display the generated first image M on the screen A of the display 215 (3300).

Afterward, referring to FIGS. 3 and 6 through 8, when a specific tool is selected based on an external input, the tool trace analyzing apparatus 210 displays, on the screen A, a second image T that corresponds to the specific tool and is in the database 216. In this regard, second images that are 3D images of one or more tools may be stored in the database 216, the second images corresponding to a plurality of pieces of feature information of the one or more tools. Feature information of a tool may indicate a usage method of the tool, a form of the tool, whether the tool is double-bladed or single-bladed, a size of the tool, or the like. The plurality of pieces of feature information may be classified into one or more categories, and a user may check a classification image LT shown in FIG. 6 by touching a tool database (DB) button 120 placed below a display area DA.

Figure 6:
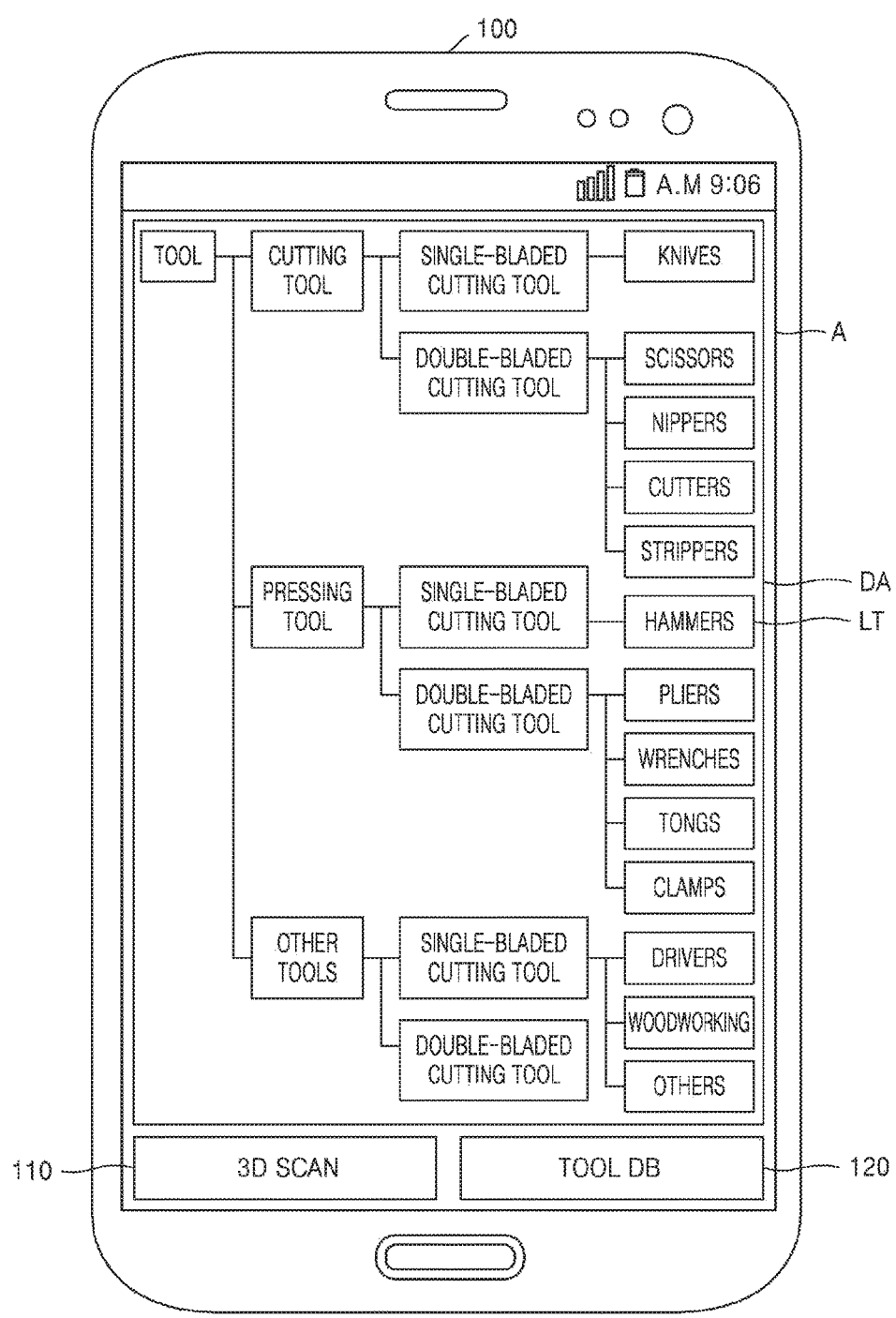

Referring to FIG. 6, the classification image LT is in the form of a logic tree. The user may roughly check a form of the tool trace via the first image, may check a usage method similar to the tool trace, and whether the tool trace indicates a double-bladed tool or a single-bladed tool, and thus may select a specific tool by touching the specific tool. However, the present disclosure is not limited thereto. In another embodiment, in the classification image LT, forms of tools may be listed as 2D images, and the whole logic tree may not be displayed but may be configured in a manner that, when a specific category is selected, an execution screen is changed for selection of a next category. The user may touch and select, from the classification image LT, a specific tool corresponding to the first image M of the tool trace.

Figure 7:
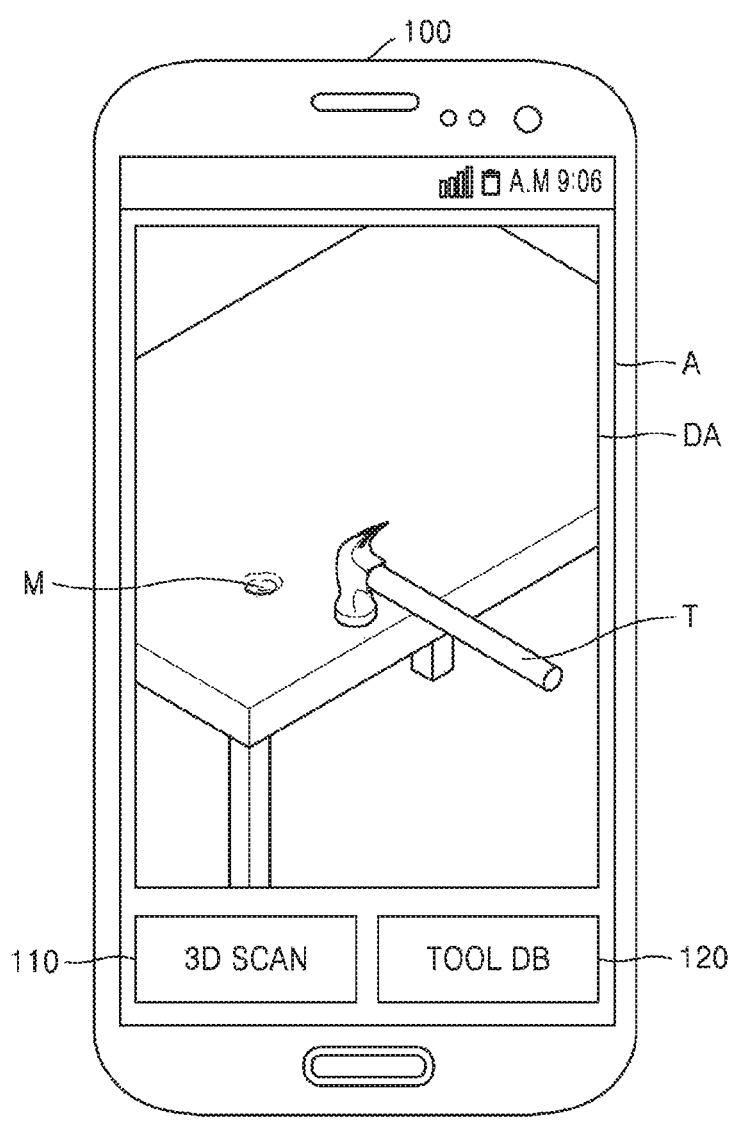
Figure 8:
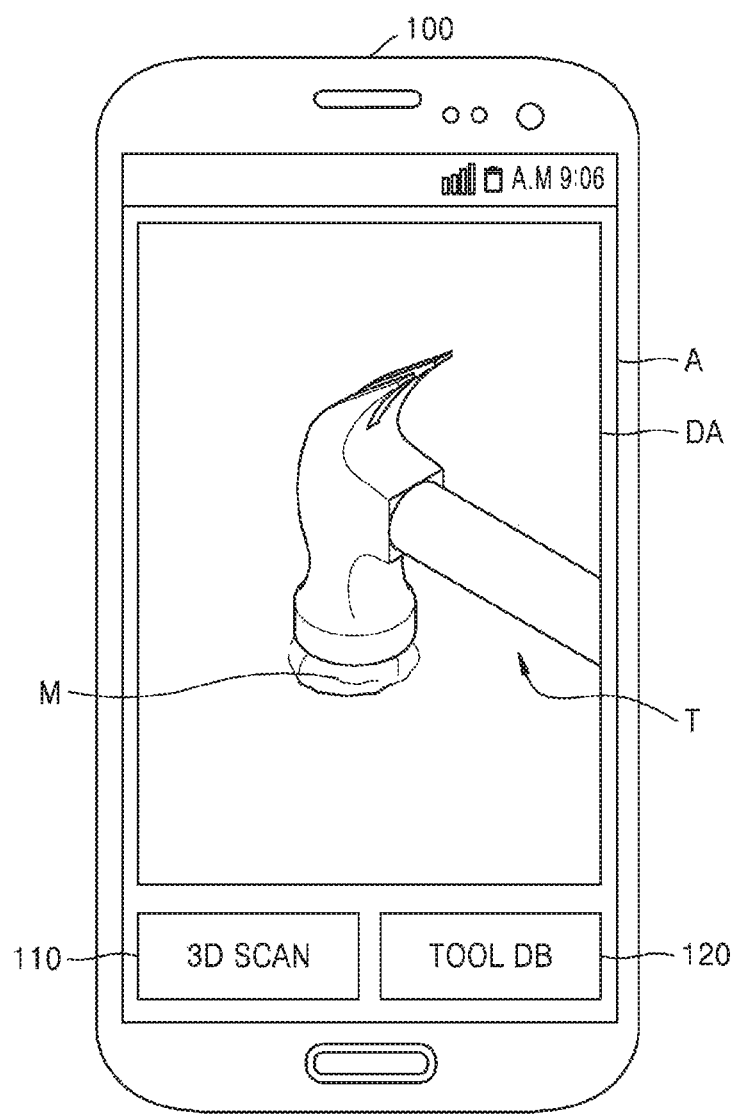

Referring to FIG. 7, the tool trace analyzing apparatus 210 may search for, in the database 216, a second image that is a 3D image of the selected specific tool (S400), and may display the found second image T on the screen A (S500). In this regard, the second image T may be displayed adjacent to the first image M so that the user may compare the second image T with the first image M. When the second image T is different from the first image M, the user may retrieve the classification image LT by touching again the tool DB button 120, may select another tool from the classification image LT, and may display the other tool on the screen A.

When the second image T is similar to the first image M, the user may touch the second image T and thus may move the second image T to a periphery of the first image M. The match image generator 213 may generate a match image by matching the second image T with the first image M that are close to each other, and may display the match image on the screen A (S600). The user may check the match image displayed on the screen A, and may confirm whether the selected specific tool is the one that was used when the tool trace was formed.

In another embodiment, the tool trace analyzing apparatus 210 may further include a determiner (not shown) to determine whether to match the first image M with the second image T. The determiner (not shown) may calculate an error between the first image M and the second image T when the first image M that is the 3D image of the tool trace is matched with the second image T that is the 3D image of the selected specific tool. In this regard, if the calculated error is greater than a preset reference value, the determiner (not shown) may determine that a target tool trace does not match with a tool, and may externally display a result of the determination so as to inform the user of the result. In addition, if the calculated error is equal to or less than the preset reference value, the determiner (not shown) may determine that the target tool trace matches with the tool, and may externally display a result of the determination so as to inform the user of the result.

The method of analyzing a tool trace according to the present embodiment illustrated in FIG. 3 can be written as computer programs and can be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), etc.

As described above, the method and apparatus for analyzing a tool trace, and a computer program for executing the method according to the embodiments allow a user to obtain a 3D image of a tool trace by using a user terminal, and display the 3D image for an analysis by the user, so that the user may rapidly and conveniently analyze the tool trace in a crime scene.

As described above, the method and apparatus for analyzing a tool trace, and a computer program for executing the method according to the embodiments allow a user to obtain a 3D image of a tool trace by using a user terminal, and display the 3D image for an analysis by the user, so that the user may rapidly and conveniently analyze the tool trace in a crime scene.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of analyzing a tool trace, the method being performed by a portable tool trace analyzing apparatus comprising a camera unit and comprising:
   obtaining a first image that is a three-dimensional (3D) image of the tool trace;
   displaying the first image on a screen;
   storing, in a database, second images that are 3D images of one or more tools and that correspond to a plurality of pieces of feature information of the one or more tools;
   when a specific tool is selected based on a user input, searching for a second image from among the second images in the database, the second image corresponding to the specific tool, and displaying the second image on the screen;
   matching the second image that is selected with the first image and thus generating a match image;
   displaying the match image on the screen;
   wherein the generating of the match image comprises:
      calculating an error between the first image and the second image;
      when the calculated error is greater than a preset reference value, the tool trace is not determined to match the specific tool, and when the calculated error is equal to or less than the preset reference value, the tool trace is determined to match the specific tool; and
      displaying a result of the determination on the screen:
   wherein the feature information of the one or more tools comprises at least a shape of a tool head; and
   wherein the generating of the match image further comprises generating the match image by matching a head part of the tool in the second image, with the first image.

2. The method of claim 1, wherein the obtaining of the first image comprises:
   obtaining two-dimensional (2D)) images at a plurality of different locations with respect to the tool trace by using the camera unit; and
   generating the first image that is the 3D image by using the 2D images.

3. The method of claim 2, wherein the obtaining of the 2D images comprises obtaining the 2D images captured at the plurality of different locations in 360-degree all directions with respect to the tool trace.

4. The method of claim 1, further comprising classifying the plurality of pieces of feature information into one or more categories, and externally displaying a classification image comprising the plurality of pieces of classified feature information of the one or more tools.

5. The method of claim 4, wherein the displaying of the second image on the screen comprises, when feature information from among the plurality of pieces of classified feature information comprised in the classification image is selected, searching for the second image of the specific tool corresponding to the selected feature information, and displaying the second image on the screen.

6. A computer program stored in a medium for executing the method of claim 1, by using a computer.

7. A portable tool trace analyzing apparatus comprising:
   a camera unit configured to obtain two-dimensional (2D) images by imaging a tool trace at a plurality of different locations with respect to the tool trace;

a first image generator configured to generate a first image that is a three-dimensional (3D) image of the tool trace by using the 2D images;

a database configured to store second images that are 3D images of one or more tools and that correspond to a plurality of pieces of feature information of the one or more tools:

a match image generator configured to search for a second image from among the second images in the database, the second image corresponding to a tool selected from among the one or more tools based on an external input, and to generate a match image by matching the second image with the first image;

a determiner configured to calculate an error between the first image and the second image during the generation of the match image, and to determine that the tool trace does not match the specific tool when the calculated error is greater than a preset reference value, and that the tool trace matches the specific tool when the calculated error is equal to or less than the preset reference value; and a display configured to externally display the first image, the second image, the match image and a result of the determination of the determiner;

wherein the feature information of the one or more tools comprises at least a shape of a tool head; and wherein the match image generator generates the match image by matching a head part of the tool in the second image with the first image.

8. The tool trace analyzing apparatus of claim 7, wherein the database is further configured to store the second images that correspond to a plurality of pieces of feature information of the one or more tools.

9. The tool trace analyzing apparatus of claim 8, further comprising a feature information classifying unit configured to classify the plurality of pieces of feature information into one or more categories and to provide, to the display, a classification image comprising the plurality of pieces of classified feature information of the one or more tools.

10. The tool trace analyzing apparatus of claim 9, further comprising a user command recognizer configured to recognize a user input, and wherein, when feature information from among the plurality of pieces of classified feature information comprised in the externally displayed classification image is selected by the user command recognizer, the match image generator is further configured to search for the second image of the tool corresponding to the selected feature information, and to generate the match image by matching the second image with the first image.

* * * * *